R. H. NEFF.
MILK BOTTLE HOLDER.
APPLICATION FILED FEB. 19, 1913.
1,078,744.
Patented Nov. 18, 1913.
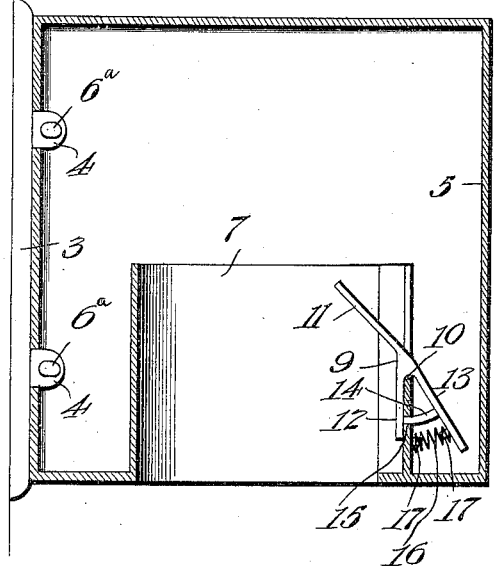
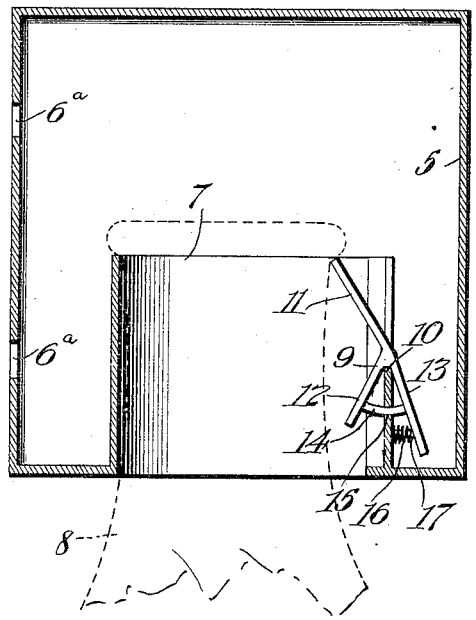
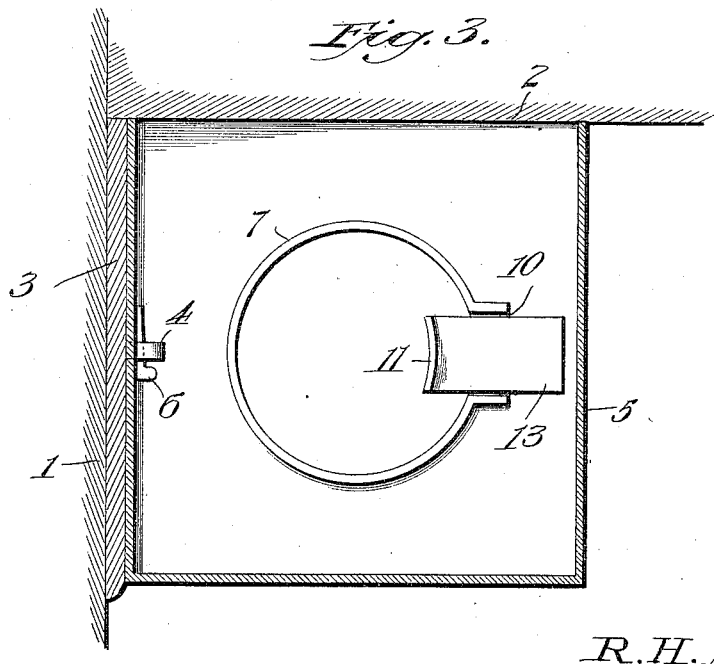
Witnesses
Inventor
R. H. Neff
By
Attorney

UNITED STATES PATENT OFFICE.

RAYMOND H. NEFF, OF PITTSBURGH, PENNSYLVANIA.

MILK-BOTTLE HOLDER.

1,078,744.   Specification of Letters Patent.   Patented Nov. 18, 1913.

Application filed February 19, 1913. Serial No. 749,520.

*To all whom it may concern:*

Be it known that I, RAYMOND H. NEFF, citizen of the United States, residing at Pittsburgh, in the county of Allegheny and State of Pennsylvania, have invented certain new and useful Improvements in Milk-Bottle Holders, of which the following is a specification.

The present invention relates to certain new and useful improvements in milk bottle holders, and has for its object to provide a device of this character which embodies novel features of construction whereby the neck of a milk bottle may be positively engaged so as to prevent theft or unauthorized removal of the milk bottle.

A further object of the invention is to provide a milk bottle holder which is comparatively simple and inexpensive in its construction, which can be readily mounted in position upon a door jamb or the like, which is always set for engagement with the neck of the bottle, and which will positively engage the neck of the milk bottle so as to prevent withdrawal therefrom after the milk bottle has once been inserted in the holder.

A still further object of the invention is to provide a milk bottle holder including a casing formed with an open front and adapted to be mounted upon a door jamb in such a manner that the open front thereof is closed by the door when shut, although access can be readily had to the interior of the casing when the door is opened, the said casing being formed with an opening through which the neck of a milk bottle can be inserted and being provided upon its interior with a detent for engaging the neck of the milk bottle.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a vertical sectional view through a milk bottle holder constructed in accordance with the invention, the detent being shown in inoperative position. Fig. 2 is a similar view showing the detent in the position assumed when in engagement with the neck of a milk bottle, the said neck of the milk bottle being indicated by dotted lines, and Fig. 3 is a horizontal sectional view through the milk bottle holder, showing the manner of mounting the same upon a door jamb.

Corresponding and like parts are referred to in the following description and indicated in all the views of the drawing by the same reference character.

Referring to the drawings, the numeral 1 designates a door jamb, and 2 a door or other similar swinging closure. A plate or strip 3 is secured to the door jamb 1, the said strip being provided with a pair of perforated lugs 4. The casing of the milk bottle holder is formed with an open front and is provided in one side thereof with a pair of openings 6ª adapted to receive the before mentioned perforated lugs 4. After the casing 5 has thus been applied to the lugs 4, retaining pins 6 are inserted through the openings thereof for the purpose of holding the casing in position. It will be observed by reference to Fig. 3 that the open front of the casing then fits against the door 2 so as to be closed thereby, the retaining pins 6 being arranged within the casing so as to prevent tampering therewith as long as the door or swinging closure 2 is shut.

A guide tube 7 projects upwardly from the bottom of the casing 5 and opens through the said bottom of the casing so that the neck of a milk bottle 8 can be thrust upwardly into the guide tube through the bottom of the casing. A longitudinal channel 9 is formed in one side of the guide tube 7, the upper portion of the back of the channel 9 being cut away to provide a pivot edge 10. A detent 11 is mounted within the channel 9, the said detent having a forked lower end which straddles and rests upon the before mentioned pivot edge 10, one of the arms 12 of the forked end being received within the channel 9, while the opposite arm 13 projects downwardly within the casing upon the exterior of the channel. The forked end of the detent is thus adapted to swing freely upon the pivot edge 10 to admit of the detent 11 being swung inwardly and outwardly radially of the guide tube 7. A curved or segmental guide member 15 connects the two arms 12 and 13 and passes loosely through an opening 14 in the back of the channel 9. This guide rod or member 14 serves to direct the detent in its swinging movements, and also to hold the forked end thereof in a proper position upon the pivot edge 10. A coil spring 16 is interposed between the back of the channel 9 and the arm 13, the ends of the said spring being engaged by positioning pins 17 which serve to hold the spring in proper position. The spring normally causes the detent 11 to be swung inwardly as indicated by Fig. 1, the inner arm 12 of the forked end of the detent then being received within the channel 9 so as not to interfere in any manner with the insertion of the neck of a milk bottle into the guide tube. When the neck of a milk bottle is inserted into the guide tube 7, as indicated by dotted lines upon Fig. 2, the bead or rim at the mouth of the milk bottle is engaged by the upper edge of the guide tube 7 and the detent 11 so as to positively prevent withdrawal of the milk bottle. The milk bottle is thus held securely in position so that any theft or unauthorized removal of the same is impossible. However, when the door or swinging closure 2 is opened, access can be readily had to the interior of the casing 5 through the open front thereof, and the detent 11 can then be readily released and the milk bottle withdrawn. The entire casing 5 can then be readily removed from the door jamb, if such is found desirable, by withdrawing the retaining pins 6 from the openings of the lugs 4.

Having thus described the invention, what I claim as new and desire to secure by Letters Patent, is:—

1. A milk bottle holder including a casing, a guide tube projecting upwardly from the bottom of the casing and opening through the bottom of the casing so as to receive the beaded neck of a milk bottle, said guide tube having a channel in one side thereof, a detent mounted within the channel and formed with a forked base, one of the arms of the forked base projecting within the channel while the opposite arm thereof is arranged upon the exterior of the guide tube, a segmental guide rod connecting the arms of the forked base of the detent and passing through the base of the channel, and a spring normally holding the detent in operative position for engagement with the beaded neck of a milk bottle to prevent withdrawal thereof from the casing.

2. A milk bottle holder including a casing, a guide tube opening through the bottom of the casing and projecting upwardly therefrom upon the interior of the casing, said guide tube having a longitudinal channel in one side thereof and the back of the channel being formed with a pivot edge, a detent formed with a forked base which straddles and rests upon the said pivot edge, a segmental guide rod connecting the forked arms of the base of the detent and passing through the back of the channel so as to direct the detent in its swinging movement, and a spring acting upon one of the forked arms for holding the detent normally in position to engage the beaded neck of a milk bottle and prevent withdrawal thereof from the guide tube.

In testimony whereof I affix my signature in presence of two witnesses.

RAYMOND H. NEFF.

Witnesses:
WM. F. HELT,
H. C. LIGGETT.

---

Copies of this patent may be obtained for five cents each, by addressing the "Commissioner of Patents, Washington, D. C."